3,395,124
POLYMERIZATION OF TRIOXAN USING A CARBONIUM HEXAFLUOROARSENATE AS A CATALYST
Herbert May, Oldbury, Worcs, Brian John Kendall-Smith, Northfield, Birmingham, and John Alan Dodd, West Bromwich, Staffs, England, assignors to British Industrial Plastics Limited, London, England, a corporation of the United Kingdom
No Drawing. Filed Nov. 18, 1965, Ser. No. 508,590
Claims priority, application Great Britain, Nov. 23, 1964, 47,553/64
20 Claims. (Cl. 260—67)

ABSTRACT OF THE DISCLOSURE

Trioxan is homo or copolymerized using a carbonium hexafluoroarsenate as a catalyst.

---

This invention relates to high molecular weight polymers, and is especially concerned with a process for the polymerization of trioxan.

According to the present invention a process for polymerizing trioxan comprises effecting the polymerization in the presence of a catalytic amount of a carbonium hexafluoroarsenate.

The term "polymerizing" as used herein is intended to include both homopolymerization of the trioxan and copolymerization of the trioxan with one or more coplymerizable compounds.

Suitable copolymerizable compounds are cyclic ethers, styrene and styrene derivatives, aldehydes, allyl compounds, cyclic esters, unsaturated aliphatic hydrocarbons, vinyl ethers and esters, and N-vinyl and C-vinyl heterocyclic compounds. Examples include dioxolane, styrene, $\alpha$-methyl styrene, $\alpha$-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ether, allyl bromide, allyl methacrylate, allyl Cellosolve, allyl cyanide, allyl benzene, allyl glycidyl ether, allyl alcohol, allyl beta-cyclohexyl propionate, allyl phenyl ether, diallyl phenyl phosphate; beta-propiolactone, delta-valerolactone, epsilon-caprolactone, trichloroethylidene lactate, methylene glycollate, lactide, ethylene oxalate, dioxanne; isobutene, butadiene, isoprene, pentadiene-1,3, cyclohexane, heptene-1, octene-1, cyclopentadiene, 4-vinyl cyclohexane, beta-pinene; methyl vinyl ether, ethyl vinyl ether, n-butyl vinyl ether, isobutyl vinyl ether, vinyl 2-ethyl hexyl ether, phenyl vinyl ether; vinyl acetate; N-vinyl carbazole, 2-vinyl pyridine and 2-vinyl-1,3-dioxan. Normally these other comonomers will make up between 0.01 and 50% of the units of the polymer, preferably between 0.1 and 20%.

The preferred carbonium hexafluoroarsenate is triphenyl methyl hexafluoroarsenate. Other suitable catalysts are diphenylmethyl hexafluoroarsenate, diphenyltolylmethyl hexafluoroarsenate, phenylditolylmethyl hexafluoroarsenate, tritolylmethyl hexafluoroarsenate, dioxolinium hexafluoroarsenate, acetyl hexafluoroarsenate and benzoyl hexafluoroarsenate.

The process is preferably carried out with the minimum of moisture and suitably under anhydrous conditions. It may be conducted under bulk conditions or it may be of advantage to conduct the polymerisation in an inert liquid medium which may be a solvent or non-solvent for the monomers under the polymerisation conditions. Suitable solvents include saturated aliphatic and cycloaliphatic hydrocarbons, chlorinated aliphatic and cycloaliphatic hydrocarbons, and aliphatic and aromatic nitro hydrocarbons. Cyclohexane is particularly suitable. It is often desirable to mix the monomer, or in the case of copolymerisation the comonomers, with an inert liquid medium, and then to add the catalyst in solution in the same or a different inert medium. For instance, the comonomers trioxan and styrene may be mixed in cyclohexane, and the carbonium hexafluoroarsenate may be added in a solvent such as nitropropane or nitroethane.

The temperature of the reaction is preferably between 0° C. and 100° C. depending on the reactants, solvent and so on, and the reaction may, if desired, be carried out under a dry inert atmosphere, such as carbon dioxide or nitrogen. In some cases, it is suitable to use superatmospheric pressure.

The catalysts of the present invention can readily be removed from the formed polymer by suitable procedures, such as washing, milling, or agitating the polymer with solvents or neutralising agents for the catalysts. It is particularly effective to remove the catalyst by treatment with a basic substance such as an amine or ammonia. The polymer is then thoroughly washed after such treatment to remove all residues, and dried.

There may be incorporated into the polymers formed by the process of the invention any of the stabilisers, antioxidants, pigments, ultra-violet light absorbers and similar materials commonly used as additives with high molecular weight oxymethylene polymers. The polymers may also, if desired, be stabilised by treating them with compounds which react with any free end group. For instance, they may be acetylated at the end-groups by reaction with acetic acid or acetic anhydride.

Polymers produced in accordance with the process of this invention are particularly useful for injection, compression and extrusion moulding.

The following examples are given for the purpose of illustrating the invention. In these examples the inherent viscosity has been determined at 60° C. on a 0.5% solution of the polymer in p-chlorophenol containing 2% alpha-pinene as stabiliser.

Example I (homopolymer)

A reaction vessel was charged with 50 g. trioxan (freshly distilled from stearylamine and calcium hydride) and 50 g. cyclohexane (dried by passing through an Amberlite IR-120 ion-exchange column). The solution was maintained at 60° in an atmosphere of dry air, and 1.5 g. of a 1% solution of triphenyl methyl hexafluoroarsenate in 1-nitropropane was added with vigorous agitation. The trioxan polymerised rapidly; the reaction was allowed to proceed for 3 hours.

When polymerisation was complete, about 50 ml. acetone were added and the resulting slurry was filtered. The resulting white polymer was homogenised by high speed agitation with about 100 ml. acetone, filtered, and washed with about 200 ml. distilled water. The polymer was then treated with 400 ml. approximately 3% aqueous ammonia at 85° for 5 minutes, filtered, washed with about 200 ml. distilled water, homogenised with acetone as before and finally dried in a vacuum oven at 50° C. The yield of polymer was 38 g. (76%). The polymer had a $K_{222}$ value of 0.38% per minute and an inherent viscosity of 2.79.

Example II (copolymer)

A reaction similar to that described in Example I was carried out, with the exception that 1.5 g. (3%) styrene was incorporated as comonomer in the reaction mixture. The yield of polymer was 30 g. (60%). The polymer had an inherent viscosity of 1.75.

Example III (homopolymer)

A reaction vessel was charged with 173 g. trioxan, freshly distilled from stearylamine and calcium hydride, and 87 g. cyclohexane (dried by passing through an Amberlite IR-120 ion-exchange column). The solution was maintained at 80° C. in an atmosphere of dry air and 0.13 g. tritolylmethyl hexafluoroarsenate was added as a 2½% solution in nitropropane with vigorous agitation. The solution became cloudy in about 15 minutes, and polymerization was allowed to continue for 3 hours, when the reaction mixture became completely solid and had to be broken up.

The polymer was recovered as in Example I, but using approximately three times the amounts of reagents therein specified. The yield was 80% and the polymer had an inherent viscosity of 2.08.

Example IV (copolymer)

A reaction vessel was charged with 123 g. trioxan, 62 g. cyclohexane, purified and dried as before, and 3.7 g. styrene. The mixture was maintained at 80° C. in an atmosphere of dry air and 0.125 g. tritolymethyl hexafluoroarsenate was added as a 2½ solution in nitropropane with vigorous agitation. The mixture went cloudy after about 2 minutes, and polymerization continued for 3 hours.

The resulting polymer was recovered as in Example I, but using approximately double the amounts of reagents therein specified. The yield was 80% of a copolymer having an inherent viscosity of 1.16.

Example V (copolymer)

This was carried out in a manner similar to Example III, except that the reactants were 160 g. trioxan, 80 g. cyclohexane, 5 g. dioxolane, and 0.75 g. tritolylmethyl hexafluoroarsenate. The reaction mixture went solid as soon as the catalyst was added, and polymerization continued for 3 hours. The resulting white copolymer was ground up and recovered as in Example III.

The polymerization of trioxan, both with and without copolymerizable monomers, in the presence of electrophilic catalysts such as boron trifluoride, certain of its complexes, stannic chloride, ferric chloride and oxonium salts, is known. We have found that the catalysts of the present invention have certain advantages over the catalysts used hitherto. The most striking advantage afforded by the catalysts of the present invention is that, as shown by the values given for the inherent viscosity in the examples, the molecular weights of the polymeric products are extremely high.

What is claimed is:

1. In a process for the production of a high molecular weight homopolymer of trioxan the improvement which consists essentially in polymerizing trioxan in the presence of a catalytic amount of a carbonium hexafluoroarsenate.

2. A process according to claim 1 wherein the catalyst is triphenyl methyl hexafluoroarsenate.

3. A process according to claim 1 wherein the catalyst is diphenylmethyl hexafluoroarsenate, diphenyltolylmethyl hexafluoroarsenate, phenylditolylmethyl hexafluoroarsenate, tritolylmethyl hexafluoroarsenate, dioxolinium hexafluoroarsenate, acetyl hexafluoroarsenate, or benzoyl hexafluoroarsenate.

4. A process according to claim 1 wherein the polymerization is effected under anhydrous conditions.

5. A process according to claim 1 wherein the polymerization is effected under bulk conditions.

6. A process according to claim 1 wherein the polymerization is effected in the presence of an inert liquid medium.

7. A process according to claim 6 wherein the inert medium is cyclohexane.

8. A process according to claim 1 wherein the polymerization is effected at a temperature between 0° C. and 100° C.

9. In a process for the production of a high molecular weight oxymethylene copolymer the improvement which consists essentially in copolymerising trioxan with at least one copolymerizable monomer in the presence of a catalytic amount of a carbonium hexafluoroarsenate.

10. A process according to claim 9 wherein the catalyst is triphenylmethyl hexafluoroarsenate.

11. A process according to claim 9 wherein the catalyst is diphenylmethyl hexafluoroarsenate diphenyl tolylmethyl hexafluoroarsenate, phenyl ditolylmethyl hexafluoroarsenate, tritolylmethyl hexafluoroarsenate, dioxolinimum hexafluoroarsenate, acetyl hexafluoroarsenate or benzoyl hexafluoroarsenate.

12. A process according to claim 9 wherein the copolymerizable monomer is styrene.

13. A process according to claim 9 wherein the copolymerizable monomer is dioxolane.

14. A process according to claim 9 wherein the copolymerization is effected under anhydrous conditions.

15. A process according to claim 9 wherein the copolymerization is effected under bulk conditions.

16. A process according to claim 9 wherein the copolymerization is effected in the presence of an inert liquid medium.

17. A process according to claim 16 wherein the inert medium is cyclohexane.

18. A process according to claim 9 wherein the copolymerization is effected at a temperature between 0° C. and 100° C.

19. A process according to claim 9 wherein the relative amounts of trioxan and copolymerizable monomer are such that said copolymerizable monomer makes up between 0.01 and 50% of the units of the resulting copolymer.

20. A process according to claim 19 wherein the relative amounts of trioxan and copolymerizable monomer are such that said copolymerizable monomer makes up between 0.1 and 20% of the units of the resulting copolymer.

References Cited

UNITED STATES PATENTS

| | | | |
|---|---|---|---|
| 3,132,166 | 5/1964 | Harrison | 260—440 |
| 3,227,689 | 1/1966 | Van Asselt et al. | 260—67 |
| 3,272,780 | 9/1966 | Wilson et al. | 260—73 |

WILLIAM H. SHORT, *Primary Examiner.*

L. M. PHYNES, *Assistant Examiner.*